(12) United States Patent
Miyashita

(10) Patent No.: US 8,287,123 B2
(45) Date of Patent: Oct. 16, 2012

(54) EYEGLASS FRAME WITHOUT NOSE PAD AND EYEGLASS SUPPORTING METHOD THEREOF

(75) Inventor: Tsutomu Miyashita, Fukui (JP)

(73) Assignee: Bridge Corporation, Echizen-shi, Fukui (JP)

( * ) Notice: Subject to any disclaimer, the term of this patent is extended or adjusted under 35 U.S.C. 154(b) by 188 days.

(21) Appl. No.: 12/735,456

(22) PCT Filed: Jan. 16, 2008

(86) PCT No.: PCT/JP2008/050413
§ 371 (c)(1),
(2), (4) Date: Jul. 16, 2010

(87) PCT Pub. No.: WO2009/090733
PCT Pub. Date: Jul. 23, 2009

(65) Prior Publication Data
US 2010/0283959 A1 Nov. 11, 2010

(51) Int. Cl.
*G02C 5/14* (2006.01)
(52) U.S. Cl. .............. 351/123; 351/51; 351/52; 351/121
(58) Field of Classification Search ............... 351/123, 351/121, 111, 51, 52
See application file for complete search history.

(56) References Cited

U.S. PATENT DOCUMENTS

| 508,457 A | * | 11/1893 | Wickliffe | 351/123 |
| 1,533,506 A | * | 4/1925 | Mann | 351/123 |
| 1,854,060 A | * | 4/1932 | Pettersson | 351/119 |

FOREIGN PATENT DOCUMENTS

| JP | 62-189425 | 8/1987 |
| JP | 9-33865 | 2/1997 |
| JP | 10-161068 | 6/1998 |
| JP | 2003-107414 | 4/2003 |
| JP | 2004-354491 | 12/2004 |
| JP | 2006-72275 | 3/2006 |
| JP | 2007-41460 | 2/2007 |

OTHER PUBLICATIONS

Form PCT/ISA/210 dated Mar. 6, 2008 (3 pages).
Form PCT/ISA/237 dated Mar. 6, 2008 (6 pages).
Form PCT/ISA/220 (1 page), Mar. 6, 2008.

* cited by examiner

*Primary Examiner* — Hung Dang
(74) *Attorney, Agent, or Firm* — Flynn, Thiel, Boutell & Tanis, P.C.

(57) ABSTRACT

The present invention provides an eyeglass frame without nose pads that can adapt to difference in face size and can exert sufficient fixation force. A nose pad-less eyeglass frame 1 that is not provided with nose pads, wherein supporting members 3 for fixing an eyeglass frame to a face are attached on temples 2, and the supporting members 3 are movable in longitudinal directions of the temples 2 so that the positions of the supporting members 3 are adjustable.

2 Claims, 8 Drawing Sheets

EYEGLASS FRAME WITHOUT NOSE PAD AND EYEGLASS SUPPORTING METHOD THEREOF

TECHNICAL FIELD

The present invention relates to a nose pad-less eyeglass frame provided with cheek pads for fixing a front portion that are attached to temples.

BACKGROUND ART

A conventional generic eyeglass frame comprises a front portion and two temples, and these temples are foldably attached via joints, such as hinges, to brackets (also referred to as "ARMOR") provided on both sides of the front portion.

The front portion comprises rims for fixing respective lenses and a bridge for coupling the rims with each other.

Furthermore, nose pads are attached to inner sides (central sides) of the rims.

Now, when eyeglasses are worn, the nose pads (nose pads) are placed on both sides of a nose, and temple tips provided on rear end portions of the temples are hooked on ears at the same time.

At this time, the entire weight of the front portion is applied to the nose (specifically to nasal bones) via the nose pads. Therefore, wearing eyeglasses for a long time period causes portions in contact with the nose pads to turn red and get contact marks, or, in the case of women, that causes their makeup to come off. Such contact marks or makeup coming-off occurs in the front of a face, so it needs to be prevented from occurring as much as possible.

In order to solve the problem, recently, such a special eyeglass frame without nose pads as described in Patent Literature 1 or Patent Literature 2 has been developed.

The eyeglass frame described in Patent Literature 1 is provided with pads for supporting eyeglasses on temples in place of nose pads, the pads being attached to distal ends of leaf springs inserted in insertion openings of temple tips.

The leaf springs are curved toward the inside of the eyeglass frame, so that, when the eyeglasses are worn, moderate pressures are applied to wearer's temples.

On the other hand, in Patent Literature 2, a side pad type eyeglass frame where fixed arms having pads are attached to temples and the pads can be positioned by adjusting bending angles of the arms is disclosed.

Patent Literature 1: JP-A-2003-121800
Patent Literature 2: JP-A-2006-72275

DISCLOSURE OF THE INVENTION

Problem to be Solved by the Invention

However, such eyeglass frames as described in the above patent literatures cannot adapt to wearer's face sizes, since the positions of the pads are fixed, and therefore a force to support the eyeglasses cannot sufficiently be exerted.

Specifically, the fixation force is decreased due to a slight movement of the face, as a result, the positions of the pads may deviate, in the worst case, the eyeglass frame itself may drop out of the face.

The present invention has been developed in order to solve the above problem.

That is, an object of the present invention is to provide an eyeglass frame without nose pads that can adapt to differences in face size and can exert fixation force sufficiently.

Means Adapted to Solve the Problem

As a result of accumulation of the present inventor's studies based upon such a technical background as described above, the present inventor has unintentionally found that the above problem could be solved by making movable a portion for supporting eyeglasses on a face, and he has completed the present invention based upon the finding.

That is, the present invention lies in (1) a nose pad-less eyeglass frame that is not provided with nose pads, wherein supporting members for fixing an eyeglass frame to a face are attached to temples, and the supporting members are movable in longitudinal directions of the temples so that the positions of the supporting members are adjustable.

Furthermore, the present invention lies in (2) the nose pad-less eyeglass frame according to the above description (1), wherein the supporting members comprise base portions, cheekbone pad portions that abut directly on a face, and coupling arms for coupling the base portions with the cheekbone pad portions, and the base portions are slidable in the temples so that the positions of the supporting members are adjustable.

Furthermore, the present invention lies in (3) the nose pad-less eyeglass frame according to the above description (1), wherein the supporting members comprise base portions, cheekbone pad portions that abut directly on a face, and coupling arms for coupling the base portions with the cheekbone pad portions, longitudinal channels that are rectangular in cross-section and that are opened outside are formed in the temples, the longitudinal channels are partially covered with cover plates to form slits, and the base portions are slidable along the longitudinal channels that are rectangular in cross-section, with the coupling arms inserted in the slits, so that the positions of the supporting members are adjustable.

Furthermore, the present invention lie in (4) the nose pad-less eyeglass frame according to the above description (1), wherein the supporting members comprise base portions, cheekbone pad portions that abut directly on a face, and coupling arms for coupling the base portions with the cheekbone pad portions, first longitudinal channels that are rectangular in cross-section are formed in the temples, inner guide frames are fitted in the first longitudinal channels, second longitudinal channels that are rectangular in cross-section and slits that are opened outside from the second longitudinal channels are formed in the inner guide frames, and the base portions are slidable along the second longitudinal channels that are rectangular in cross-section, with the coupling arms inserted in the slits, so that the positions of the supporting members are adjustable.

Furthermore, the present invention lies in (5) the nose pad-less eyeglass frame according to the above description (1), wherein the supporting members comprise base portions, cheekbone pad portions that abut directly on a face, and coupling arms for coupling the base portions with the cheekbone pad portions, longitudinal channels that are rectangular in cross-section and slits that are opened outside from the longitudinal channels are formed in the temples, and the base portions are slidable along the longitudinal channels that are rectangular in cross-section, with the coupling arms inserted in the slits, so that the positions of the supporting members are adjustable.

Furthermore, the present invention lies in (6) the nose pad-less eyeglass frame according to the above description (1), wherein the supporting members comprise base portions, cheekbone pad portions that abut directly on a face, and coupling arms for coupling the base portions with the cheekbone pad portions, longitudinal channels that are approximately oval in cross-section and slits that are opened outside from the longitudinal channels are formed in the temples, and the base portions are slidable along the longitudinal channels that are approximately oval in cross-section, with the coupling arms inserted in the slits, so that the positions of the supporting members are adjustable.

Furthermore, the present invention lies in (7) the nose pad-less eyeglass frame according to the above description (1), wherein the supporting members comprise base portions, cheekbone pad portions that abut directly on a face, and coupling arms for coupling the base portions with the cheekbone pad portions, longitudinal through-holes are formed in the temples, the base portions are screwed on exterior decorative portions through the longitudinal through-holes, and the base portions are slidable along the temples so that the positions of the supporting members are adjustable.

Furthermore, the present invention lies in (8) the nose pad-less eyeglass frame according to the above description (2), wherein the coupling arms are protruded from the base portions, further bent to rear sides of the temples 2, and further bent downward.

Furthermore, the present invention lies in (9) a method for supporting eyeglasses whose eyeglass frame is not provided with nose pads, wherein a downward rotational moment about a temple tip held over an ear is borne by a cheekbone through a supporting member that is attached to a temple and that is movable along the temple.

Incidentally, as long as the object of the present invention is achieved, it is also possible to adopt a configuration in which the above present inventions are arbitrarily combined.

Effects of the Invention

According to an eyeglass frame of the present invention, the downward rotational moment applied to eyeglasses is reliably borne by a cheekbone through a supporting member.

Furthermore, since the supporting members are movable in the longitudinal directions of the temples so that the positions of the supporting members are adjustable, the eyeglass frame can freely adapt to wearer's face size.

Furthermore, since the supporting members can abut on desired positions of wearer's cheekbones, moderate and stable force of fixation is exerted.

Therefore, even if an external force is applied, positional deviations are prevented from occurring.

DESCRIPTION OF REFERENCE NUMERALS

Figure 1:
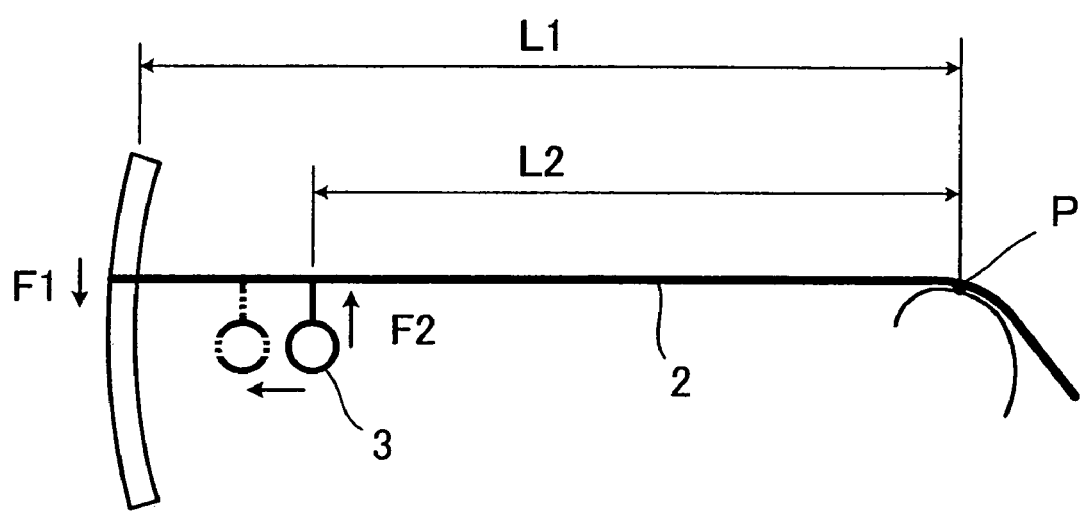
FIG. 1 is an explanatory view of a principle of an eyeglass supporting method of a nose pad-less eyeglass frame.

1: Nose pad-less eyeglass frame
11: Lens
12: Rim
12a: Bracket
12b: Bridge
2: Temple
21: Guide inner frame
22: Cover plate
3: Supporting member
31: Base portion
32: Coupling arm
32a: Coupling box
33: Cheekbone pad portion
3a: Exterior decorative portion
3a1: Boss
G: Longitudinal channel
G1: First longitudinal channel
G2: Second longitudinal channel
G3: Longitudinal through-hole
M: Temple tip
S: Slit

BEST MODE FOR CARRYING OUT THE INVENTION

Hereinafter, with reference to the drawings, if needed, preferred embodiments of the present invention will be explained in detail.

Incidentally, in the drawings, the same components are attached with the same reference numerals so that they are not repeatedly explained.

Furthermore, positional relationships between components, such as left, right, top and bottom of components, are based on their positional relationships in the drawings, unless they are specifically defined.

The size ratios in the drawings are not limited to the illustrated ones.

(Method for Supporting Eyeglasses)

An eyeglass frame according to the present invention is not provided with nose pads that are normally attached to a front portion of an eyeglass frame.

That is, the eyeglass frame according to the present invention is a nose pad-less eyeglass frame.

Instead of nose pads, the nose pad-less eyeglass frame according to the present invention is provided with supporting members (in this case, cheekbone pads) attached to temples so as to be supported by the supporting members abutting on cheekbones.

Furthermore, the supporting members are movable along the temples so as to be positionally adjustable in longitudinal directions of the temples.

FIG. 1 is an explanatory diagram of a principle of an eyeglass supporting method of an eyeglass frame without nose pads (nose pad-less eyeglass frame).

Incidentally, in FIG. 1, a position P is the point of contact of a temple tip with wearer's ear.

As shown in FIG. 1, when a weight F1 of a front portion including lenses acts downward, a rotational moment about the position P (downward rotational moment) is F1×L1.

This downward rotational moment is borne by a rotational moment F2×L2 produced by upward bearing force F2 of a supporting member.

Since a supporting member 3 can be moved and changed in position, the eyeglasses can flexibly adapt to various face sizes of difference wearers.

Incidentally, as indicated by a chain double-dashed line, when the position of the supporting member is moved forward, the force of the supporting member to support the eyeglasses (pad bearing force) is decreased.

On the other hand, when the position of the supporting member is moved rearward, the force of the supporting member to support the eyeglasses (pad bearing force) is increased.

Since the downward rotational moment about the temple tip held over an ear is borne by a cheekbone through the supporting member that is positionally adjustable along a temple 2, the eyeglass frame can adapt to wearer's face size, and therefore moderate and stable force of fixation can be obtained.

First Embodiment

Figure 2:
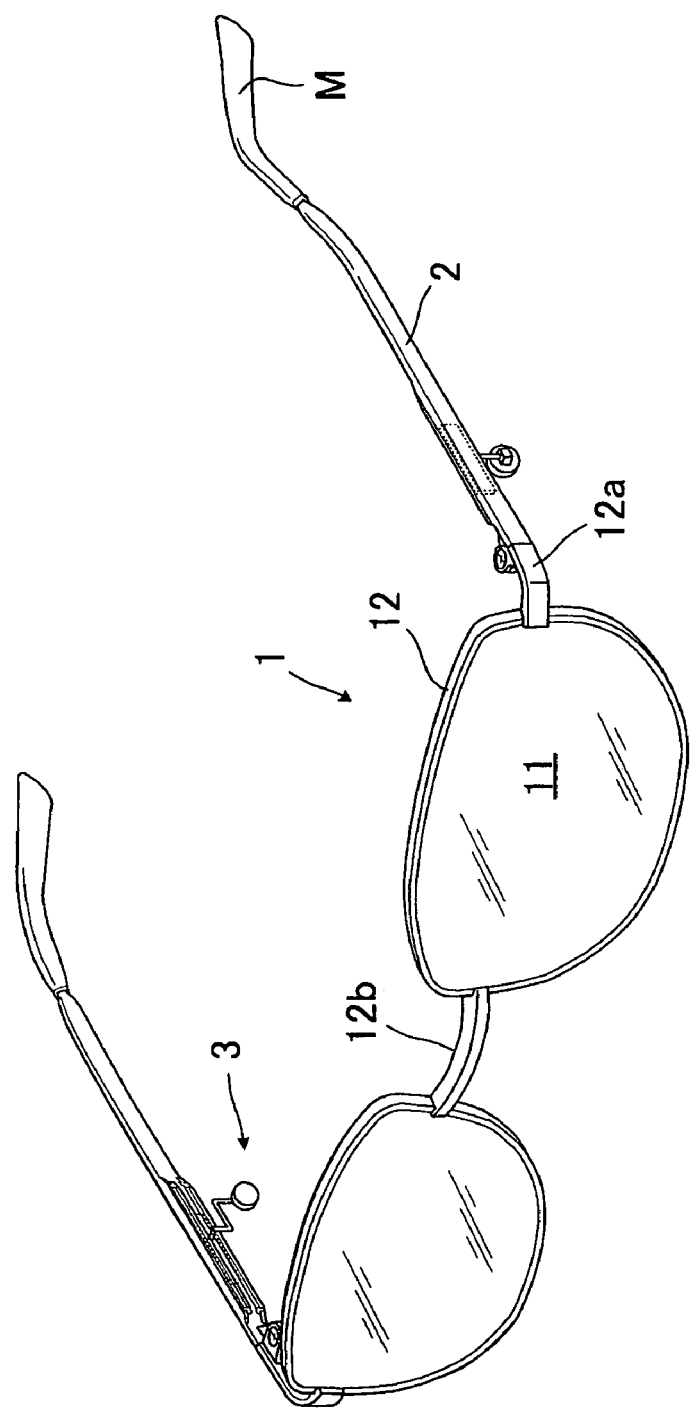
FIG. 2 is a perspective view of a nose pad-less eyeglass frame according to a first embodiment of the present invention.

FIG. 2 is a perspective view of a nose pad-less eyeglass frame according to a first embodiment of the present invention.

A front portion of a nose pad-less eyeglass frame 1 of this embodiment comprises lenses 11 and a rim 12 that fixes the lenses 11 (in this case, a full rim that surrounds the entire peripheries of the lenses is shown), and the rim 12 is provided with brackets 12a on both sides thereof and a bridge 12b at the center thereof.

Temples 2 provided with temple tips M at the rear ends thereof are pivotally attached to the rim 12 via the brackets 12a, and supporting members 3 are attached to the temples 2 and movable along the temples 2.

Figure 3A:
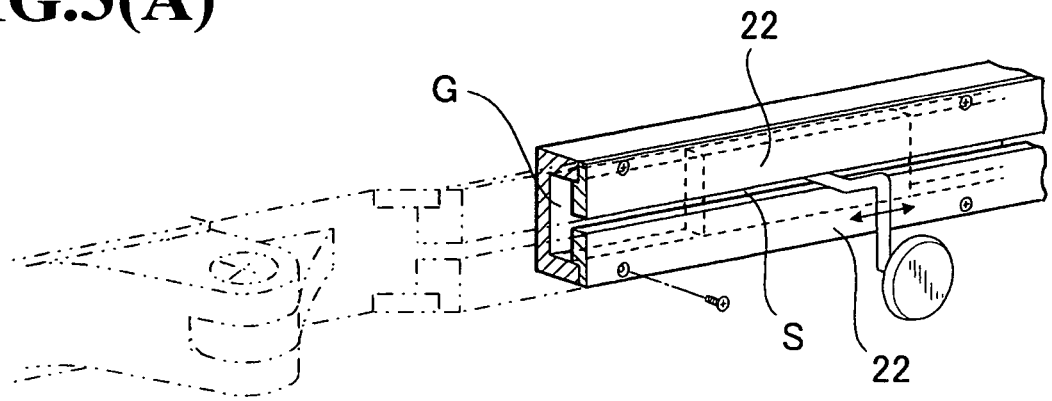
FIGS. 3A to 3C are explanatory enlarged views of a supporting member in the nose pad-less eyeglass frame in FIG. 2, FIG. 3A being an enlarged perspective view of the supporting member attached to the temple, FIG. 3B being a sectional view of the temple to which the supporting member is attached, FIG. 3C being a perspective view of the supporting member.
Figure 3B:
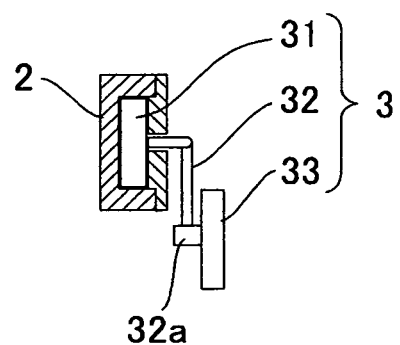
Figure 3C:
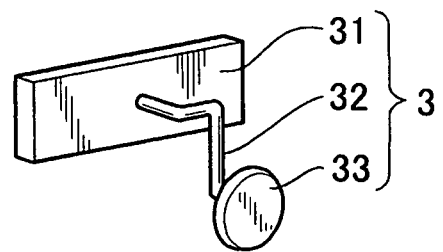

Each supporting member 3 comprises a long plate-like base portion 31, a cheekbone pad portion 33 for easing the pressure of contact with a face, and a coupling arm 32 for coupling the base portion 31 with the cheekbone pad portion 33 (see FIGS. 3A to 3C).

The supporting member 3 will be described in further detail below.

FIGS. 3A to 3C are explanatory enlarged views of the supporting member in the nose pad-less eyeglass frame 1 in FIG. 2, FIG. 3A being an enlarged perspective view of the supporting member attached to the temple, FIG. 3B being a sectional view of the temple to which the supporting member is attached, FIG. 3C being a perspective view of the supporting member.

The supporting member 3 has a linear coupling arm 32 protruded from the flat plate-like base portion 31, and the cheekbone pad portion 33 that abuts directly on a face is provided at an end portion of the coupling arm 32.

In this case, the coupling arm 32 is protruded from the base portion 31, further bent to rear sides of the temple 2, and further bent downward, so that elasticity in vertical direction and horizontal direction is given to the coupling arm 32.

Incidentally, the cheekbone pad portion 33 can perform flexible movement, because it is attached to the end portion of the coupling arm 32 via a coupling box 32a (the coupling arm 32 combined with the coupling box 32a is referred to as "BOX LEG" or "pad arm") so as to be variable in inclination to some extent.

On the other hand, a longitudinal channel G that is rectangular in cross-section and that is opened outside is formed in the temple 2, the longitudinal channel G being partially covered with cover plates 22 to form a slit S.

That is, by covering the top of the longitudinal channel G with a pair of cover plates 22 and 22 spaced from each other, the slit S extending in a longitudinal direction of the temple 2 is formed.

In this example, the slit S is formed between the pair of cover plates, but it is also possible to use one cover plate in which a slit is formed.

Incidentally, the cover plate 22 is attached to the temple 2 by screwing or the like, however, when the temple 2 and the cover plate 22 are made of synthetic resin materials, both the members can be attached to each other by adhesive bonding and, when the temple 2 and the cover plate 22 are made of metallic materials, both the members can be attached to each other by welding.

The width of the slit S is made wide enough to allow insertion of the coupling arm 32 of the supporting member 3 into the slit S.

By the way, the base portion 31 can be slid along the rectangular cross-sectional longitudinal channel G with the coupling arm 32 inserted in the slit S.

The base portion 31 is fitted a little tightly in the longitudinal channel G, thereby larger resisting force (namely, frictional force) is generated when the base portion 31 is slid along the longitudinal channel G.

This makes the supporting member 3 maintain a constant resisting force to be fixed when the supporting member 3 is held at an arbitrary position, so that the supporting member 3 can be adjusted in the longitudinal direction of the temple 2. That is, the position of fixation of the cheekbone pad portion 33 can be adjusted in the longitudinal direction of the temple 2.

Since the nose pad-less eyeglass frame 1 of the present invention has such a structure, even if face sizes (cheekbone positions) vary according to wearers, a relative positional relationship between the position of the supporting member 3, namely, the position of wearer's cheekbone, and the position of the cheekbone pad portion 33 can be adjusted.

Therefore, regardless of the wearer's face size, the cheekbone pad 33 can always be made to abut to an optimum position of a cheekbone.

Since the cheekbone pad portion 33 is supported on a cheekbone at an optimum position in this manner, the eyeglass frame is reliably and stably fixed on cheekbones by the cheekbone pad portions 33 with the temple tips M placed over ears.

Second Embodiment

A second embodiment is different in method for forming the slit S from the first embodiment. Hereinafter, the structure of coupling of a supporting member 3 with a temple 2 in the second embodiment will be explained.

Figure 4A:
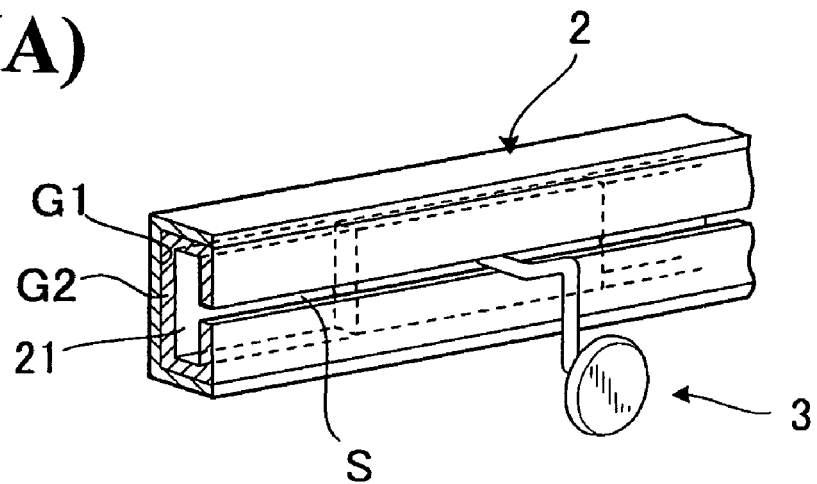
FIGS. 4A to 4C are enlarged views of a supporting member in a nose pad-less eyeglass frame of a second embodiment of the present invention, FIG. 4A being a perspective view of the supporting member attached to a temple, FIG. 4B being a sectional view of the temple to which the supporting member is attached, FIG. 4C being a perspective view of the supporting member.
Figure 4B:
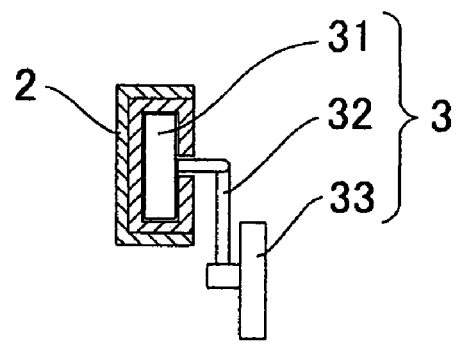
Figure 4C:
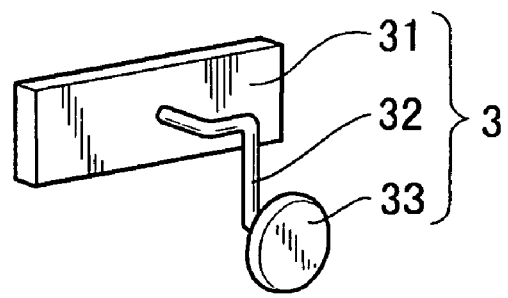

FIGS. 4A to 4C are enlarged views of a supporting member in a nose pad-less eyeglass frame 1 of the second embodiment of the present invention, FIG. 4A being a perspective view of the supporting member attached to a temple, FIG. 4B being a sectional view of the temple to which the supporting member is attached, FIG. 4C being a perspective view of the supporting member.

As shown in FIG. 4A, an opened rectangular cross-sectional first longitudinal channel G1 is formed in a temple 2 of this embodiment.

A guide inner frame 21 for slidably guiding a supporting member 3 is fitted in the first longitudinal channel G1 and fixed thereto.

A rectangular cross-sectional second longitudinal channel G2 is formed in the guide inner frame 21 such that the inside of the guide inner frame 21 is hollowed out.

Furthermore, a slit S opened outside is formed in the guide inner frame 21 so as to communicate with the second longitudinal channel G2.

The supporting member 3 of the second embodiment has a shape similar to that of the supporting member of the first embodiment, being provided with a long plate-like base portion 31, a cheekbone pad portion 33, and a coupling arm 32.

The base portion 31 is slidably fitted into the second longitudinal channel G2, thereby the supporting member 3 can be moved along the guide inner frame 21.

That is, also in this embodiment, the base portion 31 is fitted a little tightly in the second longitudinal channel G2 so that the position of the supporting member 3 is fixed by frictional force generated between the base portion 31 and the second longitudinal channel G2.

Furthermore, in the second embodiment, by selecting the size of the guide inner frame 21, the length of the slit or the like can easily be changed.

Furthermore, there is the advantage that the temple itself is reinforced, because the wall thickness of the temple is increased due to a reinforcing block (the guide inner frame 21 as a reinforcing block).

Third Embodiment

A third embodiment is different from the first embodiment and the second embodiment in that the cover plates or the guide inner frame is not used.

Hereinafter, the structure of coupling of the supporting member 3 with the temple 2 in the third embodiment will be explained.

Figure 5A:
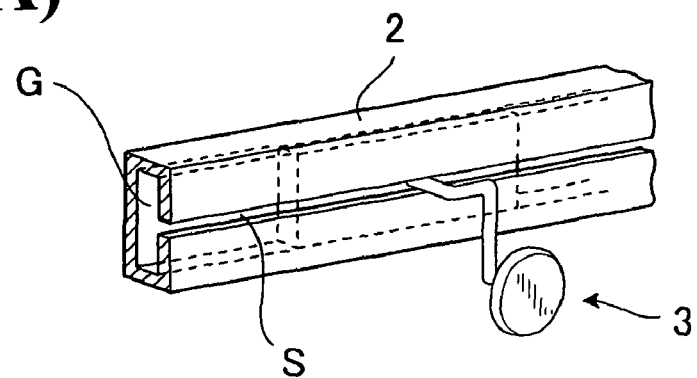
FIGS. 5A to 5C are enlarged views of a supporting member in a nose pad-less eyeglass frame of a third embodiment of the present invention, FIG. 5A being a perspective view of the supporting member attached to a temple, FIG. 5B being a sectional view of the temple to which the supporting member is attached, FIG. 5C being a perspective view of the supporting member.
Figure 5B:
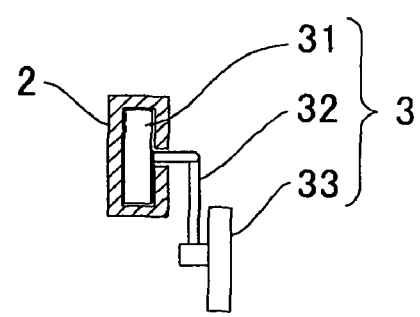
Figure 5C:
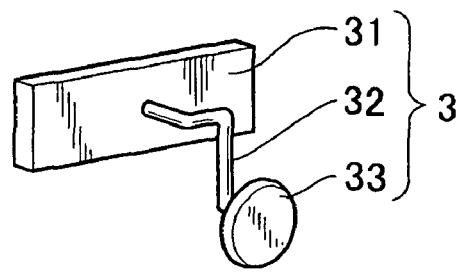

FIGS. 5A to 5C are enlarged views of a supporting member in a nose pad-less eyeglass frame of the third embodiment of the present invention, FIG. 5A being a perspective view of the supporting member attached to a temple, FIG. 5B being a sectional view of the temple to which the supporting member is attached, FIG. 5C being a perspective view of the supporting member.

As shown in FIG. 5A, a rectangular cross-sectional longitudinal channel G is formed in a temple 2 such that the inside of the temple 2 is hollowed out, and a slit S opened outside is formed in the temple 2 so as to communicate with the longitudinal channel G.

A supporting member 3 of the third embodiment also has a shape similar to that of the supporting member of the first embodiment, being provided with a base portion 31, a cheekbone pad portion 33, and a coupling arm 32.

Furthermore, also in this embodiment, the base portion 31 is fitted a little tightly in the longitudinal channel G so that the position of the supporting member 3 is fixed by frictional force generated between the base portion 31 and the longitudinal channel G.

Furthermore, since this second embodiment has a less number of components than the other embodiments have, it is easily assembled.

Fourth Embodiment

A fourth embodiment is different from the third embodiment in cross-sectional shape of the longitudinal channel G formed on the temple 3.

Hereinafter, the structure of coupling of the supporting member 3 with the temple 2 in the fourth embodiment will be explained.

Figure 6A:
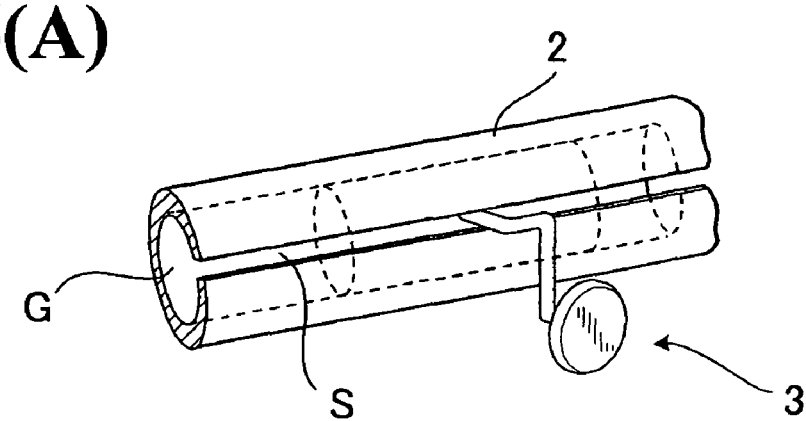
FIGS. 6A to 6C are enlarged views of a supporting member in a nose pad-less eyeglass frame of a fourth embodiment of the present invention, FIG. 6A being a perspective view of the supporting member attached to a temple, FIG. 6B being a sectional view of the temple to which the supporting member is attached, FIG. 6C being a perspective view of the supporting member.
Figure 6B:
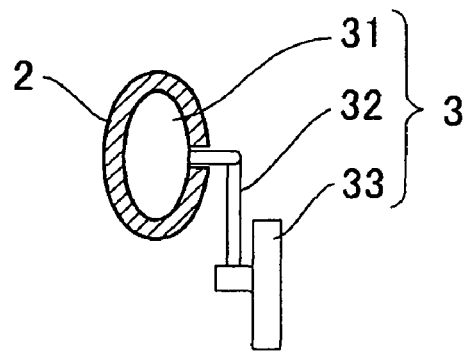
Figure 6C:
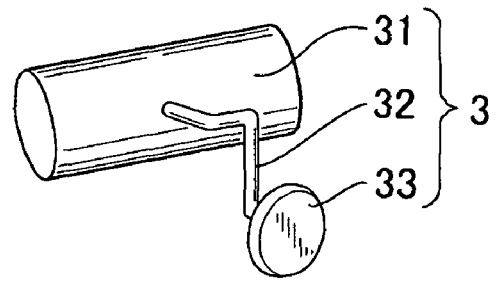

FIGS. 6A to 6C are enlarged views of a supporting member in a nose pad-less eyeglass frame 1 of the fourth embodiment of the present invention, FIG. 6A being a perspective view of the supporting member attached to a temple, FIG. 6B being a sectional view of the temple to which the supporting member is attached, FIG. 6C being a perspective view of the supporting member.

As shown in FIG. 6A, inside a temple 2 of this embodiment, an approximately oval cross-sectional longitudinal channel G is formed such that the inside of the temple 2 is hollowed out.

Furthermore, a slit S opened outside is formed in the temple 2 so as to communicate with the longitudinal channel G.

A supporting member 3 is provided with an approximately oval cross-sectional columnar base portion 31, a coupling arm 32 and a cheekbone pad portion 33, and the base portion 31 is fitted a little tightly in the longitudinal channel G.

Therefore, the supporting member 3 is moved in the longitudinal channel G, while generating a moderate frictional force with the longitudinal channel G.

In this case, it is obviously possible to make circular the cross-section of the longitudinal channel G of the temple 2, and accordingly make circular the cross-section of the supporting member 3.

Fifth Embodiment

A fifth embodiment is different from the other embodiments in the structure of the coupling of the supporting member 3 with the temple 2. Hereinafter, the structure of the coupling of the supporting member 3 with the temple 2 in the fifth embodiment will be explained.

Figure 7:
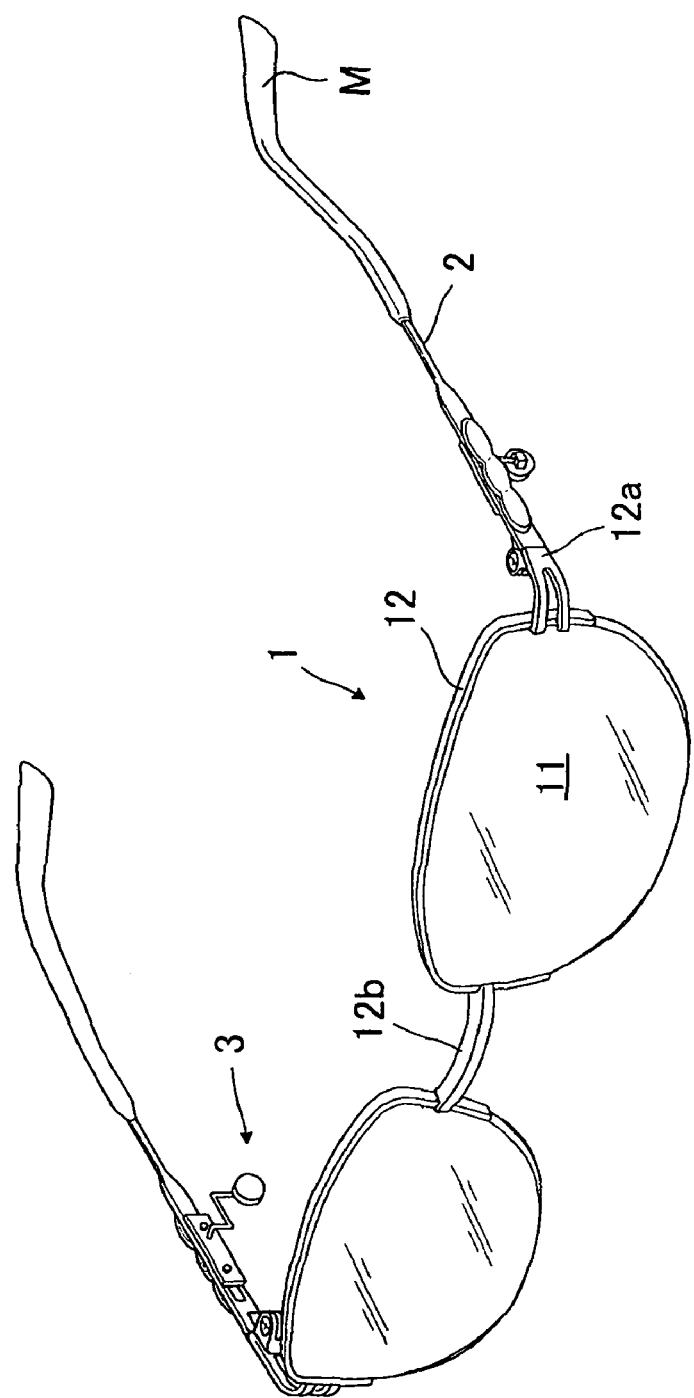
FIG. 7 is a perspective view of a nose pad-less eyeglass frame according to a fifth embodiment of the present invention.

FIG. 7 is a perspective view of a nose pad-less eyeglass frame 1 according to the fifth embodiment of the present invention.

A front portion of this nose pad-less eyeglass frame 1 comprises lenses 11, a rim 12 that fixes the lenses 11 (in this case, a half rim that surrounds a half of the periphery of each lens is shown), and the rim 12 is provided with brackets 12a on both sides thereof and a bridge 12b at the center thereof.

Furthermore, temples 2 are pivotally attached to the rim 12 via the brackets 12a, and supporting members 3 are attached to the temples 2. Each supporting member 3 comprises a base portion 31, a cheekbone pad portion 33 that abuts directly on a face, and a coupling arm 32 that couples the base portion 31 with the cheekbone pad portion 33.

The supporting member 3 is movable along the temple 2, and therefore the position thereof is adjustable.

Figure 8A:
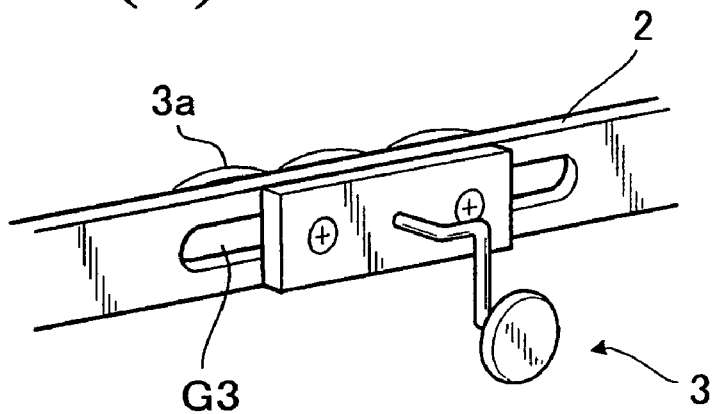
FIGS. 8A to 8C are explanatory enlarged views of a supporting member in the nose pad-less eyeglass frame in FIG. 7, FIG. 8A being a perspective view of the supporting member attached to the temple, FIG. 8B being an exploded view thereof, FIG. 8C being a sectional view thereof.
Figure 8B:
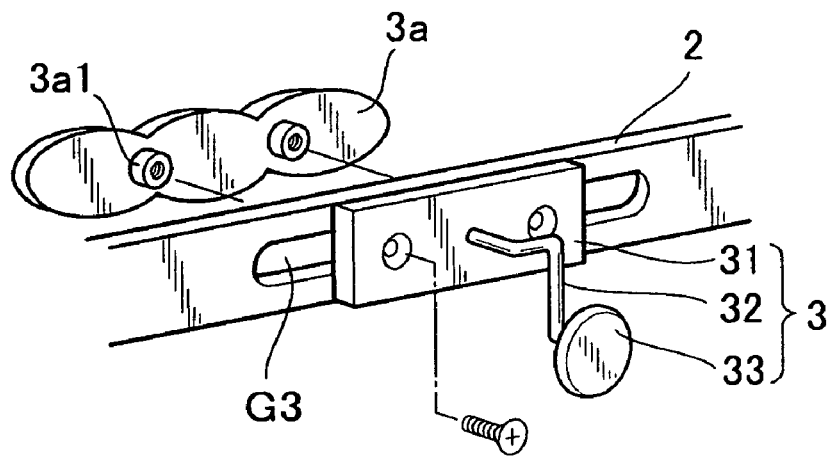
Figure 8C:
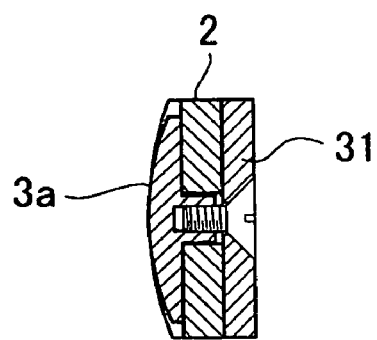

FIGS. 8A to 8C are explanatory enlarged views of the supporting member in the nose pad-less eyeglass frame 1 in FIG. 7, FIG. 8A being a perspective view of the supporting member attached to the temple, FIG. 8B being an exploded view thereof, FIG. 8C being a sectional view thereof.

As shown in FIG. 8A, a longitudinal through-hole G3 is formed in the temple 2 of this embodiment.

Also in this embodiment, the supporting member 3 has the coupling arm 32 protruded from the flat plate-like base portion 31, and the cheekbone pad portion 33 for easing contact pressure with a face is provided at an end portion of the coupling arm 32.

On the other hand, an exterior decorative portion 3a for fixing the supporting member 3 to the temple 2 is attached on the side of the temple 2 opposite to the supporting member 3.

A pair of bosses 3a1 are formed on the exterior decorative portion 3a so that the supporting member 3 is fixed with screws or the like to the bosses 3a1 inserted in the longitudinal through-hole G3.

At this time, the heights of the bosses 3s1 are designed to be shorter and lower than the thickness of the temple 2.

Such a design of heights of the bosses 3a1 makes it possible to clamp the temple 2 strongly between the supporting member 3 and the base portion 31, and the clamping force can be adjusted by changing the fastening degree of the screws.

Here, it is also possible to form the bosses not on the exterior decorative portion 3a but on the base portion 31.

In this fifth embodiment, since the exterior decorative portion 3a for attaching the supporting member 3 is exposed outside, the exterior decorative portion 3a is utilized to give various kinds of decoration.

Hereinabove, though some embodiments of the present invention have been taken as examples to explain the present invention, the present invention is not limited to the above embodiments but modified variously.

For example, an example in which the cheekbone pad portion is stopped and fixed by the frictional force (resisting force) between the base portion and the longitudinal through-hole has been shown, however, it is also possible to generate frictional force by utilizing the thickness of the coupling arm and the width of the slit. That is, by increasing the diameter of the coupling arm more than the width of the slit, frictional force can be exerted between both the members.

Furthermore, a structure for movement of the supporting member can arbitrarily be modified, as long as the supporting member is movable along the temple so that the position of the supporting member is adjustable.

Furthermore, materials for the temple and the supporting member are arbitrarily selectable, as long as the functions and the effects of the present invention can be exerted.

Furthermore, as the eyeglass frames, the full rim (FIG. 2) and the half rim (FIG. 7) are exemplified, however, the present invention is applicable to rimless eyeglasses or eyeglasses frames provided with temples that abut on the sides of a face.

INDUSTRIAL APPLICABILITY

Though the present invention relates to a nose pad-less eyeglass frame in which supporting members provided with a cheekbone pad are moved along temples so that the positions thereof are adjustable, the present invention is applicable to various nose pad-less eyeglass frames, as long as the principle thereof is utilized.

The invention claimed is:

1. A nose pad-less eyeglass frame comprising temple members, a supporting member attached to each of the temple members and movable along the longitudinal directions of the temple members so that the positions of the supporting members are adjustable, the supporting members comprising base portions, cheekbone pad portions for abutting directly on a face of a wearer and coupling arms for coupling the base portions with the cheekbone pad portions, longitudinal through-holes formed in the temple members and exterior decorative portions having a pair of bosses formed on each exterior decorative portion, wherein the base portions are screwed to the bosses of the exterior decorative portions through the longitudinal through-holes and slidable along the temple members such that the positions of the supporting members are adjustable and the heights of the bosses are less than the thickness of the temple members.

2. The nose pad-less eyeglass frame of claim 1, wherein the coupling arms extend from the base portions and are bent to rear sides of the temple members and downward.

* * * * *